(12) United States Patent
Li

(10) Patent No.: US 10,011,726 B2
(45) Date of Patent: Jul. 3, 2018

(54) FILLER OF SEALANT, METHOD FOR MANUFACTURING THE SAME AND COMPOSITE MATERIAL

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Xiaobao Li, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/204,638

(22) Filed: Jul. 7, 2016

(65) Prior Publication Data

US 2017/0101546 A1    Apr. 13, 2017

(30) Foreign Application Priority Data

Oct. 12, 2015 (CN) .......................... 2015 1 0657482

(51) Int. Cl.
  *C09D 7/12* (2006.01)
  *G02F 1/1339* (2006.01)
  *C09D 7/61* (2018.01)

(52) U.S. Cl.
  CPC ............. *C09D 7/61* (2018.01); *G02F 1/1339* (2013.01)

(58) Field of Classification Search
  None
  See application file for complete search history.

(56) References Cited

U.S. PATENT DOCUMENTS

| 2008/0151173 A1* | 6/2008 | Moon | G02F 1/13392 349/155 |
| 2009/0022909 A1* | 1/2009 | Kim | C09D 105/12 428/1.5 |
| 2016/0237326 A1* | 8/2016 | Zhao | C09J 133/08 |

FOREIGN PATENT DOCUMENTS

| CN | 101561591 A | 10/2009 |
| WO | 2014043891 A1 | 3/2014 |
| WO | WO 2015010433 A1 * | 1/2015 ............ C09J 133/08 |

OTHER PUBLICATIONS

Second Chinese Office Action, for Chinese Patent Application No. 201510657482.2, dated Sep. 4, 2017, 6 pages.

* cited by examiner

*Primary Examiner* — Colin W. Slifka
(74) *Attorney, Agent, or Firm* — Kinney & Lange, P.A.

(57) ABSTRACT

Disclosed is a filler of a sealant a filler of a sealant and a method for manufacturing the same and a composite sealant. The filler of the sealant includes a filling material and a catalyst wrapped around the filling material. The catalyst includes a material provided to melt and generate a thermal reaction when a predetermined temperature threshold is exceeded. The predetermined temperature threshold is a minimum temperature at which the sealant is subject to thermocuring. A melting point of the filling material is higher than a maximal temperature during the thermocuring of the sealant. In the filler of the sealant, it is not necessary to change an initial composition and content of the sealant, the catalyst wrapped around the filling material is heated, and then melts and generates a thermal reaction to accelerate curing efficiency of the sealant during a thermocuring of the composite sealant. Therefore, a curing time of the composite sealant is shortened and a risk of liquid crystals to be contaminated is decreased.

14 Claims, 2 Drawing Sheets

201

| stirring catalyst and filling material having granular shape uniformly at a predetermined temperature in blender to form filler of the sealant |
|---|

FILLER OF SEALANT, METHOD FOR MANUFACTURING THE SAME AND COMPOSITE MATERIAL

CROSS-REFERENCE TO RELATED APPLICATION

This application claims the benefit of Chinese Patent Application No. 201510657482.2 filed on Oct. 12, 2015 in the State Intellectual Property Office of China, the whole disclosure of which is incorporated herein by reference.

BACKGROUND OF THE INVENTION

Field of the Invention

Embodiments of the disclosure relate to field of display technique, in particularly to a filler of a sealant, a method for manufacturing the same and a composite sealant.

Description of the Related Art

A Liquid Crystal Display (LCD) has been widely used in electronic devices such as mobile phones, televisions, computer displays and the like. The LCD comprises a color filter substrate and an array substrate. Liquid crystals are filled between the color filter substrate and the array substrate to form a liquid crystal cell. In order to prevent the liquid crystals from being leaked out and external contaminations from entering the liquid crystal cell, a sealant is coated on a periphery of the liquid crystal cell. Currently, the sealant for use in the display art contains a light initiator and a thermal initiator. Thus, an UV pre-curing is firstly performed, and then a thermal curing is performed. Since the sealant not only has a good coating property but also ensures a good UV curing and thermocuring properties, optimal ratios of the respective compositions are relatively stable. Therefore, it is necessary to increase an amount of the thermal initiator if a curing rate of the sealant is desired to be improved. However, excessive thermal initiator would affect the coating property of the sealant.

SUMMARY OF THE INVENTION

Embodiments of the disclosure provide a filler of a sealant and a method for manufacturing the same and a composite sealant to improve a curing rate of the composite sealant and maintain a good coating property thereof.

According to embodiments of one aspect of the disclosure, there is provide a filler of a sealant comprising a filling material and a catalyst wrapped around the filling material, wherein the catalyst includes a material provided to melt and generate a thermal reaction when a predetermined temperature threshold is exceeded; the predetermined temperature threshold is a minimum temperature at which the sealant is subject to thermocuring; and a melting point of the filling material is higher than a maximal temperature during the thermocuring of the sealant.

According to embodiments of another aspect of the disclosure, there is provided a composite sealant comprising a sealant, and the filler of the sealant as described in the above embodiments of the disclosure, which are mixed together.

According to embodiments of yet another aspect of the disclosure, there is provided a method for manufacturing the filler of the sealant as described in the above embodiments of the disclosure comprising a step of stirring the catalyst and the filling material having a granular shape uniformly at a predetermined temperature in a blender to form the filler of the sealant.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Embodiments of the disclosure will be clearly and completely described hereinafter with reference to the accompanying drawings. Obviously, the described embodiments are merely part of the embodiments of the disclosure, rather than all of the embodiments of the disclosure. Based on the embodiments of the disclosure, other embodiments acquired by the person skilled in the art without any inventive steps will be within the scope of the disclosure.

Figures 1, 2:
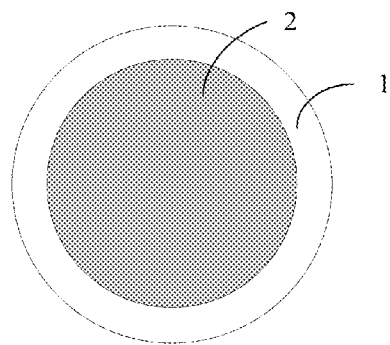
FIG. 1 is a schematic structural view of a filler of a sealant according to an exemplary embodiment of the disclosure.
FIG. 2 is a flow chart of a method for manufacturing a filler of a sealant according to a first embodiment of the disclosure.

FIG. 1 is a schematic structural view of a filler of a sealant according to an exemplary embodiment of the disclosure. According to an exemplary embodiment of the disclosure, there is provided a filler of a sealant. As shown in FIG. 1, the filler of the sealant comprises a filling material 2 and a catalyst 1 wrapped around the filling material. The catalyst 1 includes a material provided to melt and generate a thermal reaction when a predetermined temperature threshold is exceeded. The predetermined temperature threshold is a minimum temperature at which the sealant is subject to thermocuring. A melting point of the filling material 2 is higher than a maximal temperature during the thermocuring of the sealant.

In an exemplary embodiment of the disclosure, the filler of the sealant mainly includes the filling material 2 around which the catalyst 1 is wrapped. The catalyst 1 functions to be melted and generate the thermal reaction with the sealant to accelerate a curing rate of the sealant when the sealant is thermocured. Thus, the catalyst 1 includes a material which melts and generates the thermal reaction with the sealant when the predetermined temperature threshold is exceeded. The filling material 2 functions to mix with the sealant to maintain a thickness of a periphery of a liquid crystal cell. Therefore, the filling material 2 must not melt during the thermocuring of the sealant, i.e., the melting point of the filling material 2 is higher than the maximal temperature during the thermocuring of the sealant. Since the catalyst 1 functions to generate the thermal reaction during the thermocuring of the sealant, the catalyst 1 starts to melt and generate the thermal reaction with the sealant if the environment temperature is higher than the minimum temperature during the thermocuring of the sealant.

In the prior art, liquid crystal in the liquid crystal cell will bring into contact with the sealant which is not completely cured in advance during diffusing of the liquid crystal, which may cause the liquid crystal to be contaminated, thereby negatively affecting product yield and image display quality of a liquid crystal display (LCD); at the same time, a thermocuring time of the sealant is relatively longer, thereby negatively affecting production capacity. In the filler of the sealant according to embodiments of the disclosure, it is only necessary to wrap the catalyst around the filling material, and the catalyst is heated, then melts and generates the thermal reaction during the thermocuring of the sealant, rather than changing an initial composition and content of the sealant. Thus, a curing efficiency of the sealant is improved, thermocuring time of the sealant is shortened and contamination of the liquid crystal is reduced.

In an exemplary embodiment of the disclosure, the filling material may include a conventional filling material for sealing a general LCD. For example, the filling material may include a silicon or a glass fiber having a granular shape. The filling material is mainly used to maintain the thickness of the periphery of the liquid crystal cell. Further, the catalyst wrapped around the filling material has a good adhesive performance with the filling material.

Generally, the catalyst is able to melt and generate the thermal reaction within a range of the thermocuring temperature of the sealant. In an exemplary embodiment of the disclosure, the catalyst includes a hardener. The disclosure, however, is not limited thereto. The catalyst may also include other materials which may melt and generate the thermal reaction within the range of the thermocuring temperature of the sealant.

As shown in FIG. 1, in an exemplary embodiment of the disclosure, the filling material has the granular shape, for example, a spherical shape. In this way, a catalyst layer is formed on a surface of the filling material having the spherical shape so that the catalyst is wrapped around the filling material. Further, the filling material having the spherical shape has less influence on intermiscibility and mobility of the sealant.

Based on the same inventive concept, according to another aspect of the disclosure, there is provided a composite sealant comprising a sealant, and the filler of the sealant provided in the above embodiments of the disclosure, which are mixed together.

FIG. 2 is a flow chart of a method for manufacturing a filler of a sealant according to a first embodiment of the disclosure. As shown in FIG. 2, a method for manufacturing the filler of the filler of the sealant as described in the above embodiments comprises a step 201 of uniformly stirring the catalyst and the filling material having the granular shape in a blender at the predetermined temperature to form the filler of the sealant.

In the method for manufacturing the filler of the sealant according to an exemplary embodiment of the disclosure, the filling material in the granular shape and the catalyst are fed into the blender at a predetermined ratio, and then are uniformly stirred at the predetermined temperature to form the filler of the sealant. In an exemplary embodiment of the disclosure, the blender may be a centrifugal blender. The disclosure, however, is not limited thereto. Other stirring devices may also be used to realize a stirring function, as long as the filling material and the catalyst are heated and stirred uniformly at the predetermined ratio to form the filler of the sealant according to embodiments of the disclosure.

In an exemplary embodiment of the disclosure, the filling material may include a conventional filling material for sealing a general LCD. For example, the filling material may include silicon or glass fiber having a spherical shape. The filling material is mainly used to maintain the thickness of the periphery of the liquid crystal cell. Further, the catalyst wrapped around the filling material has a good adhesive performance with the filling material.

The inventor has found that if less catalyst is used, the efficiency of improving the curing is not remarkable; however, more catalyst would increase size of the filling material. In addition, if the catalyst is added to achieve a certain amount, the curing efficiency will no longer be improved. In an exemplary embodiment of the disclosure, a mass ratio of the filling material and the catalyst is about 5:1. That is to say, the filling material is five time in mass as the catalyst applied into the centrifugal blender.

Figure 3:
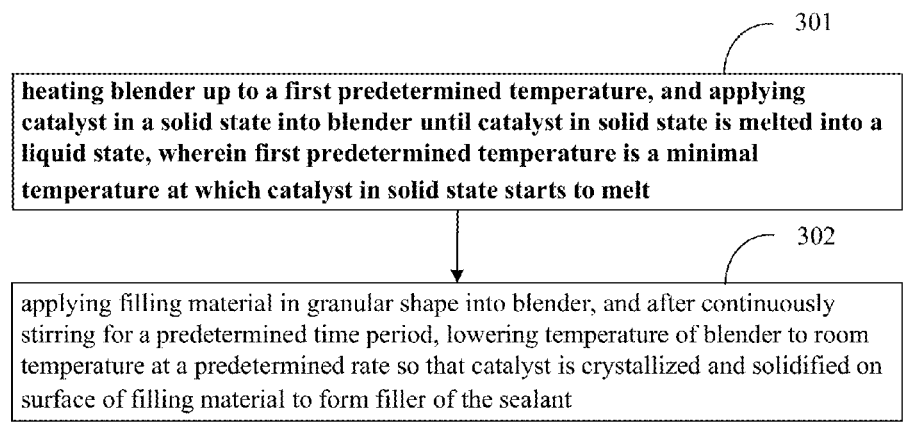
FIG. 3 is a flow chart of a method for manufacturing a filler of a sealant according to a second embodiment of the disclosure.

FIG. 3 is a flow chart of a method for manufacturing a filler of a sealant according to a second embodiment of the disclosure. As shown in FIG. 3, the above step 201 may be realized by the following steps:

a step 301 of heating the blender up to a first predetermined temperature, and then applying the catalyst in a solid state until the catalyst in the solid state is melted into a liquid state, wherein the first predetermined temperature is a minimum temperature at which the catalyst in the solid state starts to melt; and a step 302 of applying the filling material in a granular shape into the blender and stirring the filling material and the catalyst for a predetermined time period, then lowering a temperature of the blender to a room temperature at a predetermined rate, so that the catalyst is crystallized and solidified on a surface of the filling material to form the filler of the sealant.

The first predetermined temperature as described above is a minimum temperature at which the catalyst starts to melt. In an exemplary embodiment of the disclosure, the first predetermined temperature is set at about 90° C. During implementing, the first predetermined temperature is set to allow the catalyst to be melted and not allow the filling material to be melted. Therefore, it is not desired to set the first predetermined temperature too high. At the first predetermined temperature of about 90° C., the catalyst in the solid state may be melted. The melted catalyst may be adhered to the surface of the filling material better.

A second method for manufacturing a filler of a sealant according to embodiments of the disclosure will be described in detail below in which assume that a filling material is a silicon sphere.

A centrifugal blender is heated to about 90° C. A certain amount of a catalyst, such as 10 g, in a solid state is weighted and applied into the centrifugal blender. Then, the catalyst is heated for about 30 min at the temperature of about 90° C. and is continuously stirred until the catalyst is completely melted into a liquid state, wherein the catalyst in the liquid state may be adhered to a surface of the filling material better. A certain amount of the silicon sphere, such as 50 g, is weighted and served as the filling material. The silicon sphere is then slowly applied into the centrifugal blender by a funnel and continuously stirred for about 10 min. Thereafter, a temperature of the blender is lowered to a room temperature of about 25° C. at a temperature drop rate of 15° C./min to facilitate storing and preserving the filling material. During this time period, the catalyst is gradually crystallized and solidified on the surface of the silicon sphere. After the crystallization and solidification, the stirring is continued for 10 min and then is stopped until an interior temperature of the centrifugal blender is stabilized to prevent the filling materials from being adhered together during the crystallization. Thus, the silicon sphere wrapped with the catalyst thereinaround is formed. Finally, the silicon sphere wrapped with the catalyst is mixed with the sealant, by an existing centrifugal defoaming method, to form the composite sealant for normal use.

Figure 4:
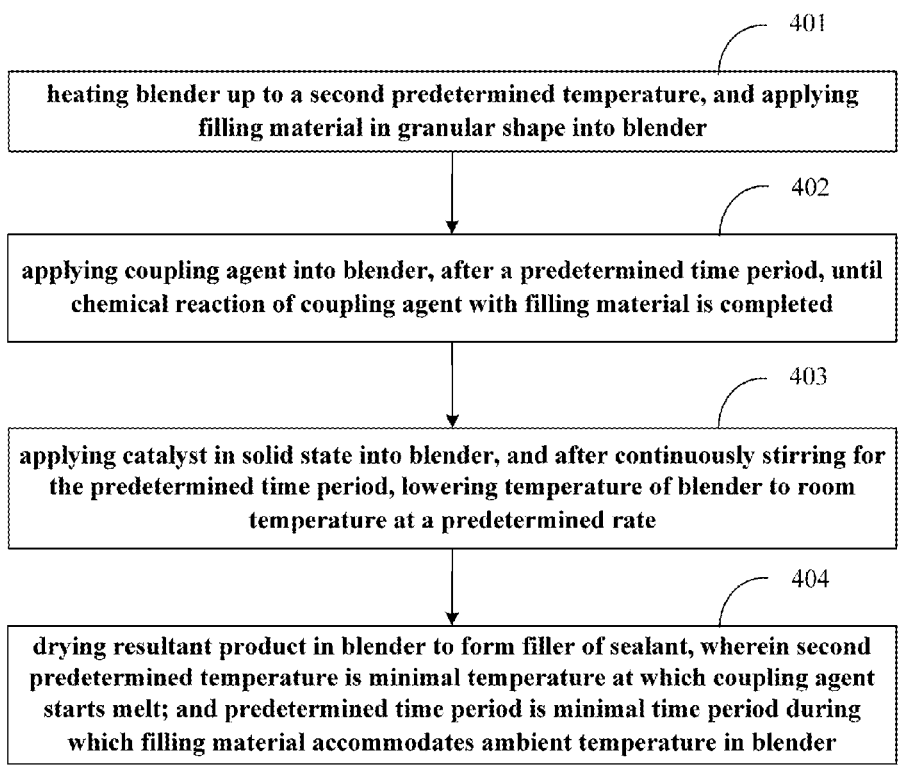
FIG. 4 is a flow chart of a method for manufacturing a filler of a sealant according to a third embodiment of the disclosure.

FIG. 4 is a flow chart of a method for manufacturing a filler of a sealant according to a third embodiment of the disclosure. As shown in FIG. 4, the above step 201 may be realized by the following steps:

a step 401 of heating the blender up to a second predetermined temperature and then applying the filling material having the granular shape;

a step 402 of applying a coupling agent into the blender, after a predetermined time period, until a chemical reaction of the coupling agent with the filling material is completed;

a step 403 of applying the catalyst in a solid state into the blender and stirred for a predetermined time period, and then lowering the temperature of the blender to a room temperature at a predetermined drop rate; and a step 404 of drying the resultant product in the blender to form the filler of the sealant, wherein the second predetermined temperature is a minimum temperature at which the coupling agent starts to melt, and the predetermined time period is a minimum time period during which the filling material is able to accommodate to an ambient temperature in the blender.

The above second predetermined temperature is the minimum temperature at which the coupling agent is able to melt. In an exemplary embodiment of the disclosure, the second predetermined temperature is set at about 50° C. During implementing, the second predetermined temperature is set to allow the coupling agent to melt and not allow the filling material to melt. Therefore, it is not desired to set the second predetermined temperature too high. At the second predetermined temperature of about 50° C., the coupling agent may be melted, and the melted coupling agent may chemically react with the filling material better.

A third method for manufacturing the filler of the sealant according to embodiments of the disclosure will be described in detail below in which assume that the filling material comprises the silicon sphere.

A centrifugal blender is heated to about 50° C. A certain amount of the silicon sphere, such as 50 g, is weighted and placed into the centrifugal blender. After 5 min, a coupling agent is slowly applied into the centrifugal blender by a funnel. The silicon sphere is served as the filling material. Thereafter, the coupling agent is applied again after a predetermined time period such as about 5 min. In this way, it is possible to allow the silicon sphere to accommodate a high temperature ambient within the centrifugal blender such that a temperature of the silicon sphere approaches an internal temperature of the centrifugal blender to allow the silicon sphere to completely react with the coupling agent. The heating is continued for about 30 min to allow the coupling agent to be melted into a liquid state, so that the coupling agent in the liquid state may chemically react with the silicon sphere better. In this way, a surface treatment of the silicon sphere is completed by the coupling agent, i.e., the chemical reaction is completed.

A certain amount of the catalyst in a solid state, such as 10 g, is weighted and slowly applied into the centrifugal blender by the funnel. Then, the stirring is continued for about 30 min to allow the catalyst to be melted and uniformly mixed with the silicon sphere which has been subjected to the chemically reaction. Thereafter, a temperature of the blender is lowered to a room temperature of 25° C. at a temperature drop rate of 15° C./min to facilitate storing and preserving the filling material. At this time, the resultant products is brought out and placed into an oven of about 50° C. to be dried for 3 hours, i.e., performing a drying treatment, to form the silicon sphere wrapped with the catalyst. Finally, the silicon sphere wrapped with the catalyst is mixed with the sealant, by an existing centrifugal defoaming method, to form the composite sealant for normal use.

In order to illustrate the superiority of the filler of the sealant according to embodiments of the disclosure, Table 1 shows an experimental comparison results in aspects of viscosity and curing time of the composite sealant comprising the silicon spheres wrapped with the catalyst according to embodiments of the disclosure, an existing general sealant, and a sealant added with the catalyst.

Specific testing conditions are as follows: three different sealants including the general sealant, the sealant added with the catalyst (the ratio of the catalyst to the sealant is 0.3% by mass), and the composite sealant comprising the silicon spheres wrapped with the catalyst according to embodiments of the disclosure (the ratio of the catalyst to the sealant is 0.3% by mass) are tested in the experiment. Items of testing and comparing in the experiment comprise the viscosity and curing time, wherein the viscosity is measured by a E-type viscosity meter (specifically see Table 1, the temperature is 25° C., 1 rpm), the curing time is a time at which a curing rate of 95% is reached, and an scanning electron microscope (SEM) such as HITACHI SU-8200 is employed.

TABLE 1

| | Sealant | | | |
|---|---|---|---|---|
| Comparison Item | General Sealant | Sealant Added with Catalyst (0.3%) | Composite Sealant Comprising Silicon Spheres Wrapped with Catalyst (0.3%) | Test Method |
| Viscosity | 295788 | 336236 | 297552 | E-type Viscosity Meter |
| Curing Time (min) [Curing Rate of 95%] | 65 | 58 | 43 | HITACHI SEM (SU-8200) |

As shown in Table 1, the composite sealant comprising the silicon spheres wrapped with the catalyst has the substantial same viscosity as that of the general sealant, and the sealant added with the catalyst has a maximal viscosity. Further, the composite sealant comprising the silicon spheres wrapped with the catalyst has a minimal curing time, the sealant added with the catalyst has a relatively longer curing time, and the general sealant has a maximal curing time due to not having any additives for improving the curing time. Therefore, as shown from the comparison experiment, the silicon spheres wrapped with the catalyst according to embodiments of the disclosure may accelerate the curing rate of the sealant through the thermal reaction induced by the catalyst, without changing the initial composition, content and viscosity of the sealant. Thus, it is possible to decrease the curing time and reduce a risk of contamination of the liquid crystal.

During the experiment, section SEM maps of the three sealants are viewed. From these section SEM maps, it can be also obtained that the catalyst in the sealant only added with the catalyst is not diffused well and has a relative slow melting rate, however, the composite sealant comprising the silicon spheres wrapped with the catalyze is relatively uniform and thin and is relatively easy to be diffused.

Embodiments of the disclosure provide a filler of a sealant, a method for manufacturing the same and a composite sealant. The filler of the sealant comprises a filling material and a catalyst wrapped around the filling material. The catalyst includes a material provided to melt and generate the thermal reaction when the predetermined temperature threshold is exceeded. The predetermined temperature threshold is a minimum temperature at which the sealant generates a thermocuring. A melting point of the filling material is higher than the maximal temperature during the thermocuring of the sealant. In the filler of the sealant according to embodiments of the disclosure, it is not necessary to change the initial composition and content of the sealant, the catalyst wrapped around the filling material is heated, then melts and generates the thermal reaction to accelerate curing efficiency of the sealant during the thermocuring of the composite sealant. Therefore, a curing time of the composite sealant is shortened and the risk of liquid crystals to be contaminated is decreased.

Obviously, those skilled in the art may make various changes or modifications to these embodiments without departing from the principle and spirit of the disclosure. Thus the disclosure is intended to cover these changes and modifications if these changes and modifications fall within the scope of the claims and their equivalents.

What is claimed is:

1. A composite sealant, comprising a sealant for a liquid crystal display, and a filler, which are mixed together, wherein the filler comprises:
    a filling material; and
    a catalyst wrapped around an outer surface of the filling material completely, the catalyst including a material provided to melt and generate a thermal reaction with the sealant when a predetermined temperature threshold is exceeded;
    wherein the predetermined temperature threshold is a minimum temperature at which the sealant is subject to thermocuring, and a melting point of the filling material is higher than a maximal temperature during the thermocuring of the sealant.

2. The composite sealant according to claim 1, wherein the filling material comprises silicon or glass fiber.

3. The composite sealant according to claim 1, wherein the catalyst comprises a hardener.

4. The composite sealant according to claim 1, wherein the filling material has a granular shape.

5. The composite sealant according to claim 4, wherein the filling material has a spherical shape.

6. A method for manufacturing the composite sealant according to claim 1, comprising steps of:
    heating a blender up to a first predetermined temperature, and applying the catalyst in a solid state into the blender until the catalyst in the solid state is melted into a liquid state, wherein the first predetermined temperature is a minimal temperature at which the catalyst in the solid state starts to melt;
    applying the filling material having a granular shape into the blender, and after continuously stirring for a predetermined time period, lowering a temperature of the blender to a room temperature at a predetermined rate so that the catalyst is crystallized and solidified on a surface of the filling material to form the filler; and
    mixing the filler with the sealant for a liquid crystal display.

7. The method according to claim 6, wherein a ratio of the filling material and the catalyst is about 5:1 by mass.

8. The method according to claim 6, wherein the blender comprises a centrifugal blender.

9. The method according to claim 6, wherein the filling material comprises silicon or glass fiber.

10. The method according to claim 6, wherein the catalyst comprises a hardener.

11. The method according to claim 6, wherein the filling material has a spherical shape.

12. The method according to claim 6, wherein the first predetermined temperature is set at about 90° C.

13. A method for manufacturing the composite sealant according to claim 1, comprising steps of:
    heating a blender up to a second predetermined temperature, and applying the filling material having a granular shape into the blender;
    applying a coupling agent into the blender, after a predetermined time period, until a chemical reaction of the coupling agent with the filling material is completed;
    applying the catalyst in a solid state into the blender;
    melting the catalyst in the solid state into a liquid state at a first predetermined temperature;
    after continuously stirring for a preset time period, mixing the catalyst in the liquid state with the filling material which underwent the chemical reaction, and lowering the temperature of the blender to a room temperature at a predetermined rate;
    drying the resultant product in the blender to form the filler; and
    mixing the filler with the sealant for the liquid crystal display,
    wherein the first predetermined temperature is a minimal temperature at which the catalyst in the solid state starts to melt, the second predetermined temperature is a minimal temperature at which the coupling agent starts to melt; and the predetermined time period is a minimal time period during which the filling material accommodates to an ambient temperature in the blender.

14. The method according to claim 13, wherein the second predetermined temperature is set at about 50° C.

* * * * *